(12) United States Patent
Taaghol (10) Patent No.: US 8,953,636 B2
(45) Date of Patent: Feb. 10, 2015

(54) END-TO-END FEATURE SUPPORT SIGNALING

(75) Inventor: Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 734 days.

(21) Appl. No.: 12/646,862

(22) Filed: Dec. 23, 2009

(65) Prior Publication Data

US 2011/0019592 A1 Jan. 27, 2011

Related U.S. Application Data

(60) Provisional application No. 61/227,071, filed on Jul. 21, 2009.

(51) Int. Cl.
*H04J 3/16* (2006.01)
*H04W 12/06* (2009.01)
*H04L 29/06* (2006.01)
*H04W 76/02* (2009.01)

(52) U.S. Cl.
CPC ........... *H04W 12/06* (2013.01); *H04L 63/0823* (2013.01); *H04W 76/022* (2013.01)
USPC ........... 370/465; 370/252; 370/259; 709/220; 455/435.1

(58) Field of Classification Search
USPC ............... 370/465, 259, 352, 252, 254, 338, 370/395.32, 331; 709/220; 455/436, 435.1, 455/432.1
See application file for complete search history.

(56) References Cited

U.S. PATENT DOCUMENTS

| | | | | |
|---|---|---|---|---|
| 5,412,375 A | * | 5/1995 | Wood | 455/451 |
| 7,899,166 B1 | * | 3/2011 | Ravindranath et al. | 379/114.2 |
| 8,195,159 B1 | * | 6/2012 | Narendran et al. | 455/435.1 |
| 8,311,010 B1 | * | 11/2012 | Qian et al. | 370/331 |
| 2003/0103484 A1 | * | 6/2003 | Oommen et al. | 370/338 |
| 2007/0223523 A1 | * | 9/2007 | Montpetit et al. | 370/465 |
| 2009/0168754 A1 | * | 7/2009 | Shan | 370/352 |

* cited by examiner

*Primary Examiner* — Dang Ton
*Assistant Examiner* — Mandish Randhawa
(74) *Attorney, Agent, or Firm* — Blakely, Sokoloff, Taylor & Zafman LLP (57) ABSTRACT

Techniques and mechanisms to communicate end-to-end feature compliance information. Network access requests may be accompanied by compliance/certification/compatibility information for the requesting device as well as intervening devices. A network authentication device may evaluate the request and associated compliance/certification/compatibility information to select one or more network features to allow the requesting device to utilize.

16 Claims, 5 Drawing Sheets

Fig. 5 ent Patent Application No. 61/227,071, entitled, METHODS TO ENABLE RELEASE SIGNALING IN WiMAX, filed Jul. 21, 2009.

TECHNICAL FIELD

Embodiments of the invention relate to wireless communications. More particularly, embodiments of the invention relate to techniques for communicating feature support information related to wireless-enabled hardware components.

BACKGROUND

Currently, as new devices come to market these new devices may support new features and functionality. Thus, the feature sets provided by different devices may be very different. Wireless networks are therefore required to provide access to many different wireless devices that support different features and request access to different resources.

Problems can occur when a device that does not fully support or properly utilize a feature requests resources related to the feature. Similarly, problems can occur when a device that supports a feature requests a feature that is not fully supported by network resources. Thus, failure to match supported functionality between devices and network resources can result in network inefficiencies.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are techniques and mechanisms to communicate end-to-end feature compliance information. Network access requests may be accompanied by compliance/certification/compatibility information for the requesting device as well as intervening devices. A network authentication device may evaluate the request and associated compliance/certification/compatibility information to select and/or limit one or more network features to allow the requesting device to utilize.

Figure 1:
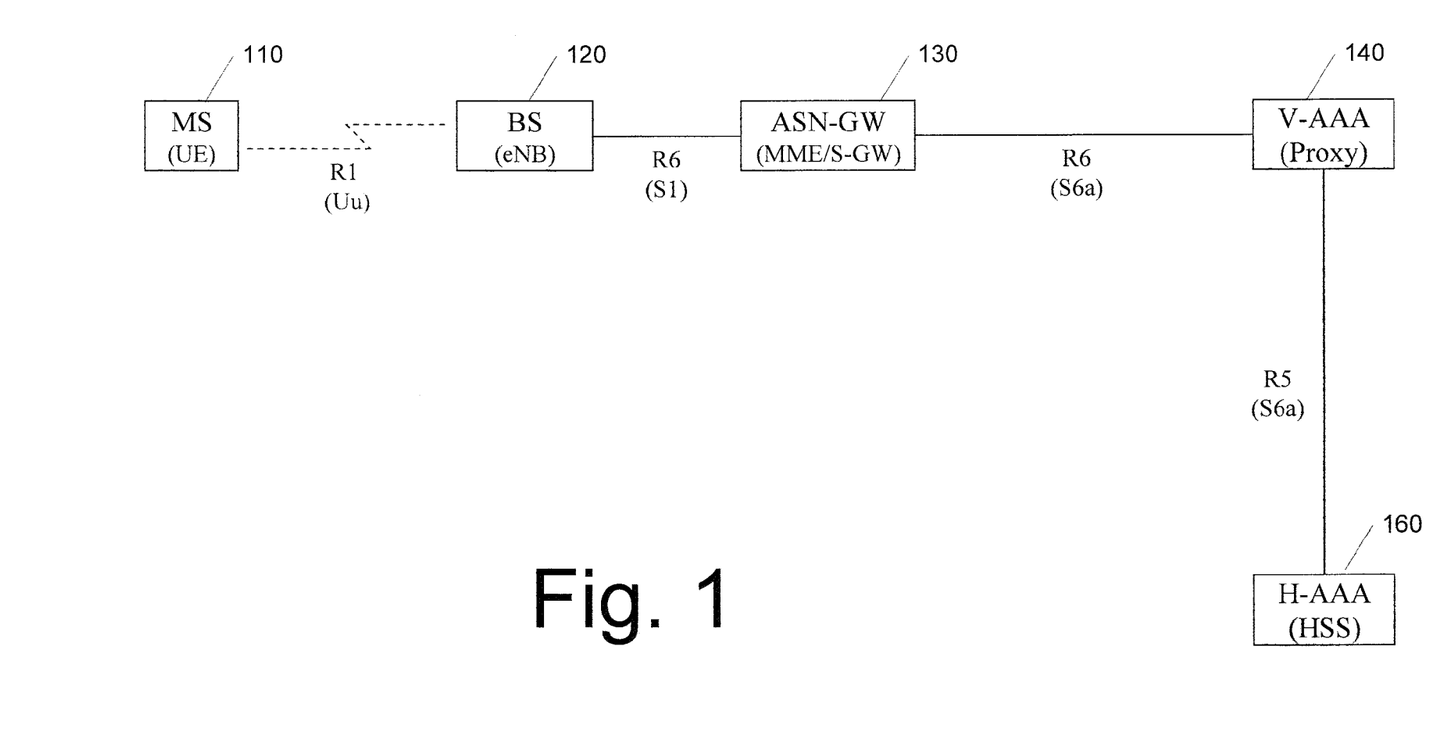
FIG. 1 is a block diagram of one embodiment of a wireless network.

FIG. 1 is a block diagram of one embodiment of a wireless network. The example of FIG. 1 is for a mobile station that visits a new network. A similar interaction may occur when the mobile device first accesses a home network. In one embodiment, the wireless network of FIG. 1 is an IEEE 802.16-compliant (aka. WiMAX) wireless network. In alternate embodiments, other wireless protocols may be supported such as 3GPP LTE/EPC (Long Term Evolution/Evolved Packet Core). IEEE 802.16 refers to IEEE Standard for Local and metropolitan area networks Part 16: Air Interface for Broadband Wireless Access Systems as well as related (e.g., other IEEE 802.16 standards) and subsequent standards.

Wireless network 100 is a collection of devices that provide wireless communications according to one or more wireless protocols, for example, IEEE 802.16. In the example embodiment of FIG. 1, wireless network 100 includes at least mobile station 110 (or UE: User Equipment), base station 120 (or eNB: Evolved Node-B), Access Service Network (ASN) gateway 130 (or MME/S-GW: Mobility Management Entity/Serving-Gateway), local Authentication, Authorization and Accounting (AAA) server 140, and home AAA server 160 (or HSS: Home Subscriber Server). Multiple base stations may be coupled with ASN gateway 130. Also, multiple mobile stations can interact with the multiple base stations via the wireless communications protocols supported by wireless network 100.

In one embodiment, the interfaces between the base stations and the mobile stations are wireless. For example, in a WiMAX embodiment, this may be a R1 connection and in a LTE/EPC embodiment is may be a Uu connection. Various wireless protocols can be used, for example IEEE 802.16. The interconnections between ASN gateway 130, local AAA server 140, network 150, home AAA server 160 and base stations 120 can be wired, wireless or any combination thereof. In a WiMAX embodiment, these may be R6 and R5 connections and in a LTE/EPC embodiment, these may be S1 and S6a connections. In one embodiment the communication between ASN gateway, 130, local AAA server 140, network 150, home AAA server 160 and base station 120 utilizes Internet Protocol (IP)-based communications.

Mobile station 110 can be any type of mobile device, for example, laptop computer, cellular telephones, netbook computers, that are configured to communicate using the wireless communication protocol(s) supported by the wireless network. ASN gateway 130 provides an interface for base stations (e.g., base station 120) to connect to the local wireless network. Local AAA server 140 provides authentication and authorization functionality for the local wireless network that mobile station 110 is attempting to access.

Home AAA server 160 provides authentication and authorization functionality for the home wireless network corresponding for mobile station 110. Network 150 is any type of network that provides an interconnection between servers for various wireless networks. For example, network 150 can be the Internet. The example of FIG. 1 includes only one base station and only one mobile station; however, any number of base stations and mobile stations can be supported.

When mobile station 110 attempts to connect with base station 120, login or authorization information is transmitted from mobile station 110 to base station 120 and possibly through to local AAA server 140. This login or authentication information can include, for example, an identifier (e.g., login name, user identifier, device identifier), an authentication code (e.g., password, serial number, digital signature) as well as other information. In one embodiment, this login information includes an indication of the certification(s) associated with mobile station 110 with respect to features and functionality supported by mobile station 110.

Figure 2A:
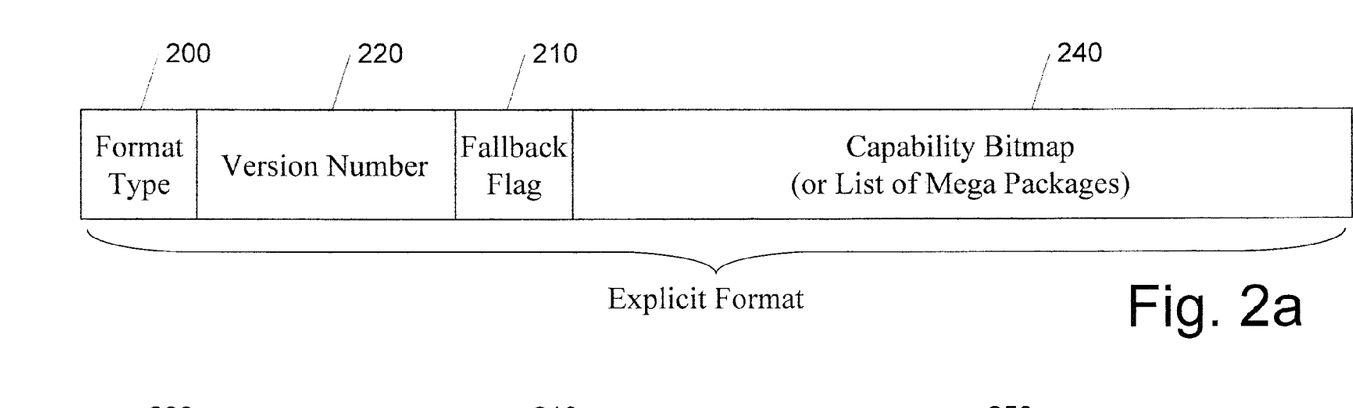
FIGS. 2a-2b are a conceptual diagram of embodiments of a block of data that can be used to communicate compliance number information.
Figure 2B:
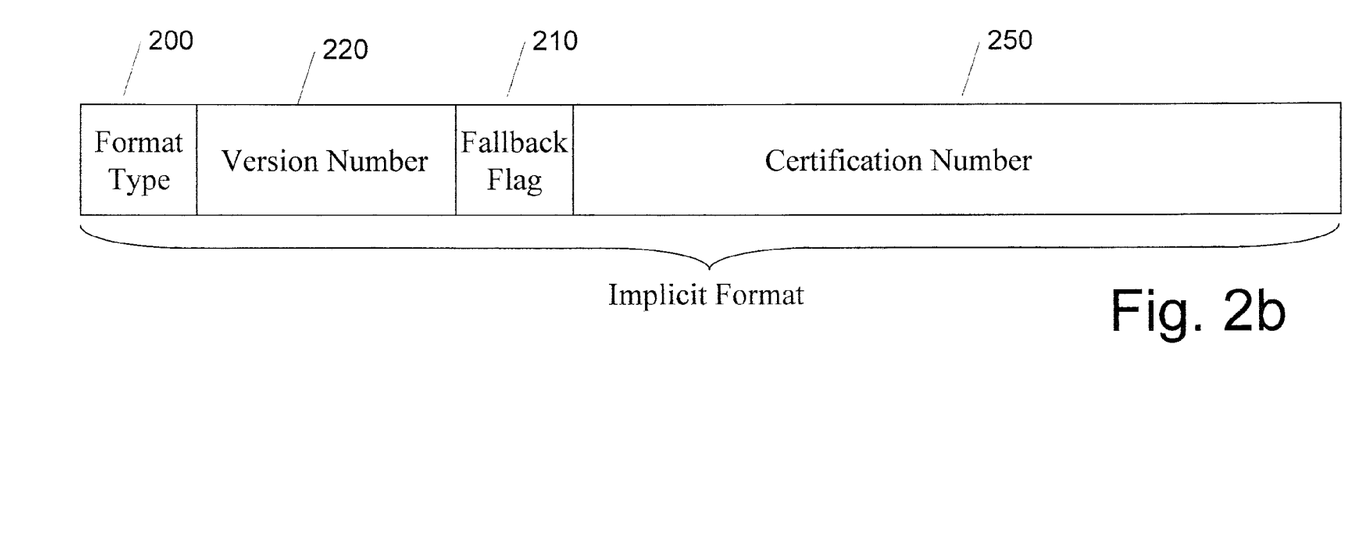

FIGS. 2a-2b are a conceptual diagram of embodiments of a block of data that can be used to communicate compliance number (CN) information. FIG. 2a is a conceptual diagram of one embodiment of a CN block having an explicit format. In an explicit format CN, the payload portion (capability bitmap or list of mega packages) explicitly indicates the capabilities of the wireless device. FIG. 2b is a conceptual diagram of one embodiment of a CN block having an implicit format. In an implicit format CN, the payload portion (certification) implicitly indicates the capabilities of the wireless device, which requires further processing and/or lookup to ascertain the capabilities of the wireless device.

Specific field lengths are provides as an example embodiment, different field lengths can also be used. In one embodiment, the CN format may be explicit where the features supported are enumerated by a bitmap or a list of mega-package numbers. In another embodiment, the CN format may be implicit where a pre-assigned number to certified MS is used and the feature/capability mappings are performed in the network by use of a certification database lookup/retrieval.

In one embodiment, each CN includes a format type field, a fallback field, a version number field and a capability or certification number field; however, additional and/of different fields can also be supported. Format type field 200 indicates whether the CN conforms to explicit format or implicit format. Fallback field 210 can be used to indicate whether the mobile station can fall back to previous releases/revisions/packages. That is, fallback field 210 can be used to indicate whether the mobile station is backwards compatible. Version number field 220 can be used to indicate a version corresponding to a feature that is supported.

Capability bitmap (or list of mega package) field 240 can provide compatibility information in a bitmap type format (use of mega packages is described in greater detail below). Certification number field 250 carries a certification number. The following table can provide an example feature table:

TABLE 1

Example Feature Enumeration

| Feature | Name | Comment |
|---|---|---|
| 1 | IPv4 | Used by MS |
| 2 | IPv6 | Used by MS |
| 3 | PMIPv4 | Not used by MS nor BS |
| 4 | PMIPv6 | Not used by MS nor BS |
| 5 | OTA | Not used by BS |
|  |  | For ASN-GW, shows hotline support |
| 6 | LBS-UP | LBS-User Plane |
| 7 | MBS-DSx |  |
| 8 | MBS-App |  |
| 9 | USI | Not used by BS nor ASN-GW |
| 10 | ROHC |  |
| 11 | PHS |  |

Similarly, mega packages, or groups of features may be communicated in the package field. The following table can provide an example mega-package table:

TABLE 2

Example Mega Package Enumeration

| Mega Package | Features |
|---|---|
| 1 | 1, 3, 5 |
| 2 | 1, 2, 3, 4, 5 |
| 3 | 1, 2, 3, 4, 5, 7, 12 |
| 4 | 1, 3, 5, 2, 4, 7, 9, 10, 11 |
| 5 | 2 |
| 6 | 1, 2, 3, 4, 10 |
| 7 | 1, 3, 5, 8, 10 |
| 8 | 1, 2, 3, 4, 5, 6, 8 |
| 9 | 1, 2, 3, 4, 5, 6, 8 |
| 10 | 1, 7, 10 |

Use of feature and mega package numbers rather than bit mapping provides a more efficient communication of supported features because many features have dependencies on other features. With 19 bits 524,288 combinations ($2^{19}$) rather than 19 combinations can be supported. A mega package may include a group of one or more features. In one embodiment, the features in a mega package are not optional, but the mega package itself could be optional.

Figure 3:
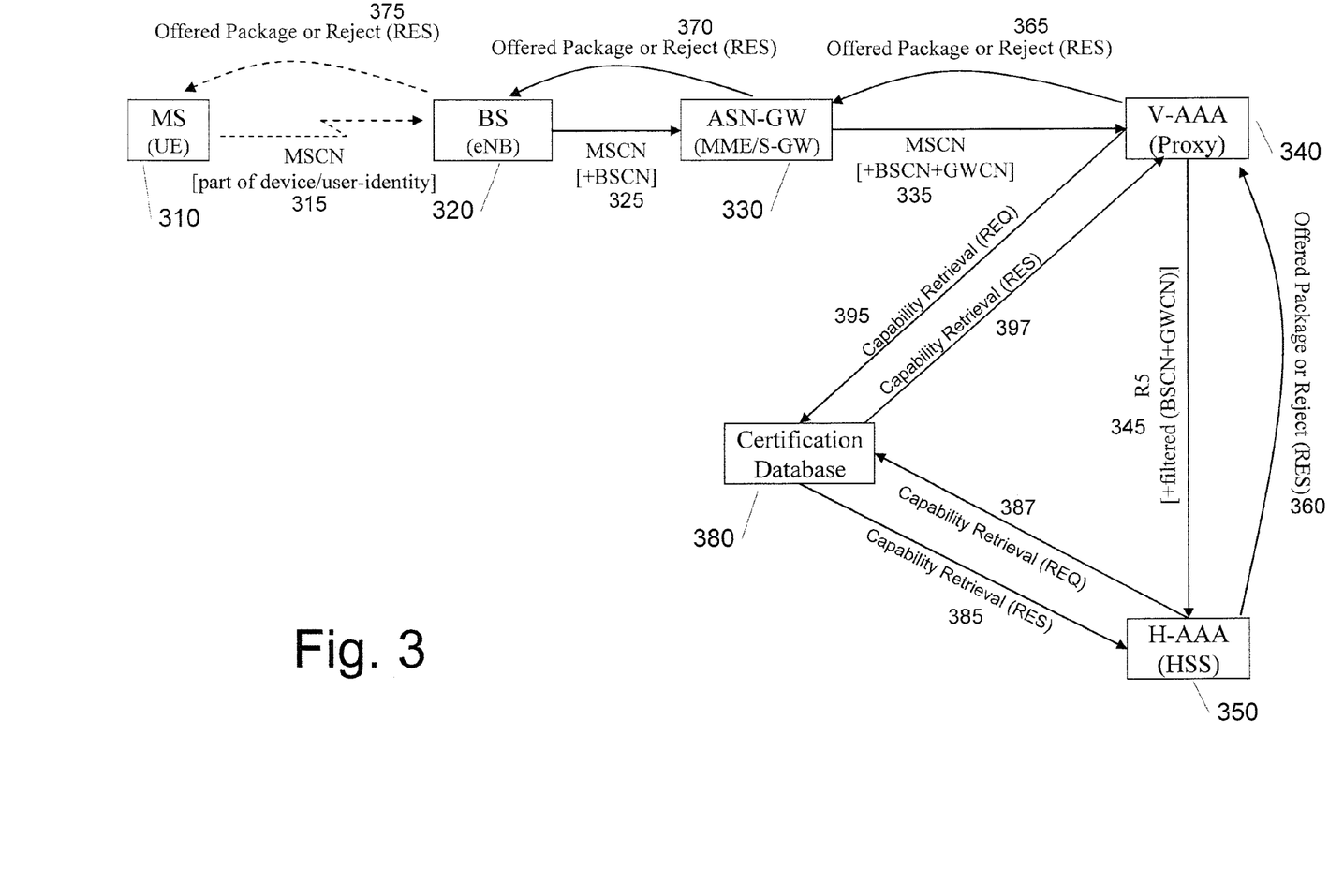
FIG. 3 is a transaction diagram of components of a wireless network that communicate capability information.

FIG. 3 is a transaction diagram of components of a wireless network that communicate capability information. The example of FIG. 3 is explained in terms of a WiMAX embodiment using WiMAX network elements. An alternate embodiment using the LTE/CPE network elements described above in FIG. 1 can also be supported in a similar manner, but using the messages and protocols for that communications environment.

In one embodiment, the components of the wireless network communicate capability information using the CN format described above; however, other mechanisms can also be supported. In one embodiment, when mobile station 310 attempts to access a wireless network, mobile station 310 sends login/access information, for example, as described above along with the mobile station CN (MSCN) 315 to base station 320.

In one embodiment, base station 320 sends an Extensible Authentication Protocol (EAP) Request/Identity message to mobile station 310. In response, mobile station 310 sends an EAP Response/Identity-NAI message that includes MSCN. Extensible Authentication Protocol is described in Internet Engineering Task Force (IETF) Request for Comments (RFC) 3748 entitled "Extensible Authentication Protocol (EAP)" published June 2004, IETF RFC 5247 entitled "Extensible Authentication Protocol (EAP) Key Management Framework" published August 2008, as well as related documents.

When base station 320 receives MSCN 315, base station 320 adds its CN (MSCN) when passing the login information through the network. In one embodiment, this is accomplished by base station 320 sending an EAP Response/Identity-NAI that includes both the BSCN and the MSCN. Thus, base station 320 sends MSCN/BSCN 325 along with the login information to ASN gateway 330.

When ASN gateway 330 receives MSCN/BSCN 335 from base station 320, ASN gateway 330 adds its CN (GWCN) when passing the login information through the network. In one embodiment, ASN gateway 330 sends an access request to local AAA server 340 in the form of an EAP Payload: Identity-NAI that includes the MSCN and VSAs with the BSCN and the MSCN. Thus, ASN gateway 330 sends MSCN/BSCN/GWCN 335 to local AAA server 340.

When local AAA server 340 receives MSCN/BSCN/GWCN 345 from ASN gateway 330, local AAA server 340 adds its Connectivity Service Network (CSN) CN information when passing the login information through the network. In the case of a roaming mobile station, local AAA server 340 may filter some the listed capabilities to form the filtered MSCN/BSCN/GWCN. Thus, AAA server 340 sends (filtered) MSCN/BSCN/GWCN 345 to home AAA server 350. When the mobile station is accessing a home network a Home CSNCN (hCSNCN) may be used by home AAA server, omitting a local AAA server.

For CNs having an explicit format, local AAA server 340 and/or home AAA server 350 can process the capability/compatibility information and make appropriate access decisions. For CNs having an implicit format, local AAA server 340 and/or home AAA server 350 may be required to perform additional operations including referencing a lookup table or database to determine the capabilities/compatibilities for the requesting device.

In one embodiment, the database or lookup table may be maintained by certification database 380, which may reside on a server other than local AAA server 340 or home AAA server 350. In such an embodiment, local AAA server 340 may send a capability retrieval request 395 to certification database 380 to retrieve capability/compatibility information from certification database 380. In response certification database 380 may send a capability retrieval response 397 providing the requested information to local AAA server 340.

Similarly, home AAA server 350 may send a capability retrieval request 385 to certification database 380 to retrieve capability/compatibility information from certification database 380. In response certification database 380 may send a capability retrieval response 387 providing the requested information to home AAA server 350.

Because end-to-end feature support requires support from several network components to function properly and it is possible to have varying support for a feature in different parts of a network due to, for example, multi-vendor infrastructure or other conditions, CN information from various network components can be considered to determine the proper feature set to provide a mobile station. As illustrated in FIG. 3, each network element provides a CN and the relevant CNs are provided to home AAA server 350 for evaluation and a decision on which features can be provided to mobile station 310.

Upon receiving MSCN/BSCN/GWCN 345 from local AAA server 340, home AAA server 350 evaluates the information provided by the various CNs to determine the features to provide. In one embodiment, home AAA server 350 maintains a database or table that is utilized by home AAA server 350 in this evaluation. The following table can provide an example feature requirement table (FRT) that may be maintained by home AAA server 350:

TABLE 3

Example Feature Requirement Table

| Feature | MS | BS | ASN Gateway | CSN |
|---|---|---|---|---|
| 1 (Simple IPv4) | Min. req. MSCN | Min. req. BSCN | Min. req. GWCN | Min. req. CSNCN |
| 2 (Simple IPv6) | Min. req. MSCN | Min. req. BSCN | Min. req. GWCN | Min. req. CSNCN |
| 3 (PMIPv4) | Same as Feature 1 | N/A | Min. req. GWCN | Min. req. CSNCN |
| 4 (PMIPv4) | Same as Feature 2 | N/A | Min. req. GWCN | Min. req. CSNCN |
| 5 (OTA) | Min. req. MSCN | N/A | Min. req. GWCN | Min. req. CSNCN |
| 6 (LBS-UP) | Min. req. MSCN | N/A | Min. req. GWCN | Min. req. CSNCN |
| 7 (MBS-DSx) | Min. req. MSCN | Min. req. BSCN | Min. req. GWCN | Min. req. CSNCN |
| 8 (MBS-App) | Min. req. MSCN | Min. req. BSCN | Min. req. GWCN | Min. req. CSNCN |
| 9 (USI) | Same as Feature 1 | N/A | N/A | Min. req. CSNCN |
| 10 (MBS-DSx) | Min. req. MSCN | Min. req. BSCN | Min. req. GWCN | N/A |
| 11 (PHS) | Min. req. MSCN | Min. req. BSCN | Min. req. GWCN | N/A |

In the example FRT, the fields include a minimum CN value corresponding to the various network elements in order to offer the feature. In one embodiment, home AAA server 350 and/or local AAA server 340 may include topological information for the wireless network that may also be used in the decision process. The content of the FRT may be populated out of band where network elements negotiate capabilities independent of this procedure.

In one embodiment, home AAA server 350 utilizes the FRT table, or similar compliance and/or compatibility information, to select a set of features for which mobile station 310 will be authorized to access. This set of features is communicated from home AAA server 350 to local AAA server 340 via response 360. Local AAA server 350 may utilize information from response 360 in future network operations. For example, local AAA server 340 can use information from response 360 to maintain or update topological information.

Local AAA server 340 sends response 365 to ASN gateway 330 to indicate to ASN gateway 330 at least the set of features for which mobile station 310 will be authorized to access. Similarly, ASN gateway 330 sends response 370 to base station 320 to indicate to base station 320 at least the set of features for which mobile station 310 will be authorized to access. Finally, base station 320 sends response 375 to mobile station 310 to notify mobile station 310 of the set of features mobile station 310 will be allowed to access.

In one embodiment, the AAA server(s) may utilize Remote Authentication Dial In User Service (RADIUS) protocols to support CNs for end-to-end compatibility signaling.

RADIUS is described in Internet Engineering Task Force (IETF) Request for Comments (RFC) 2865 entitled "Remote Authentication Dial In User Service (RADIUS)" published June 2000, IETF RFC 2866 entitled "RADIUS Accounting" published June 2000, as well as related documents.

In one embodiment, the following RADIUS AAA messages and attributes may be used to support CNs for end-to-end compatibility signaling.

TABLE 4

RADIUS AAA messages and attributes

| Attribute | Type | Description | Access Request | Access Chall. | Access Accept | Access Reject |
|---|---|---|---|---|---|---|
| User Name | 1 | Decorated NAI obtained from EAP-Response Identity (Outer-NAI) with MSCN | 1 | 0 | 0-1 | 0 |
| BSCN | 26/TBD | BS Compliance Number | 0-1 | 0 | 0 | 0 |
| GWCN | 26/TBD | GW Compliance Number | 0-1 | 0 | 0 | 0 |
| Network Rejection Information | 26/TBD | Network Rejection Information to be passed to Mobile Station | 0 | 0 | 0-1 | 0 |

In one embodiment, the following rejection classes and codes are used in the RADIUS AAA Network Rejection message to indicate a compliance/compatibility mismatch to the mobile station.

TABLE 5

Rejection Classes

| Rejection Class | Rejection Duration | Applicability Of Visited/ Home AAA | Emergency Service Override | Scope of Rejection |
|---|---|---|---|---|
| A | Until power cycle | Home AAA | Yes | All NAPs |
| B | Until power cycle | Visited AAA | Yes | V-NAP |
| C | Until power cycle | Home AAA | No | All NAPs |
| D | Until power cycle | Visited AAA | No | V-NAP |
| E | Until timer expiry | Home AAA | Yes | All NAPs |
| F | Until timer expiry | Visited AAA | Yes | V-NAP |
| G | Until timer expiry | Home AAA | No | All NAPs |
| H | Until timer expiry | Visited AAA | No | V-NAP |
| I | Until location criteria met | Home AAA | Yes | All NAPs |
| J | Until location criteria met | Visited AAA | Yes | V-NAP |
| K | Until location criteria met | Home AAA | No | All NAPs |
| L | Until location criteria met | Visited AAA | No | V-NAP |
| X | Until Mobile Device Upgrade/Downgrade | Home AAA | No | All-NAP |

Figure 4:
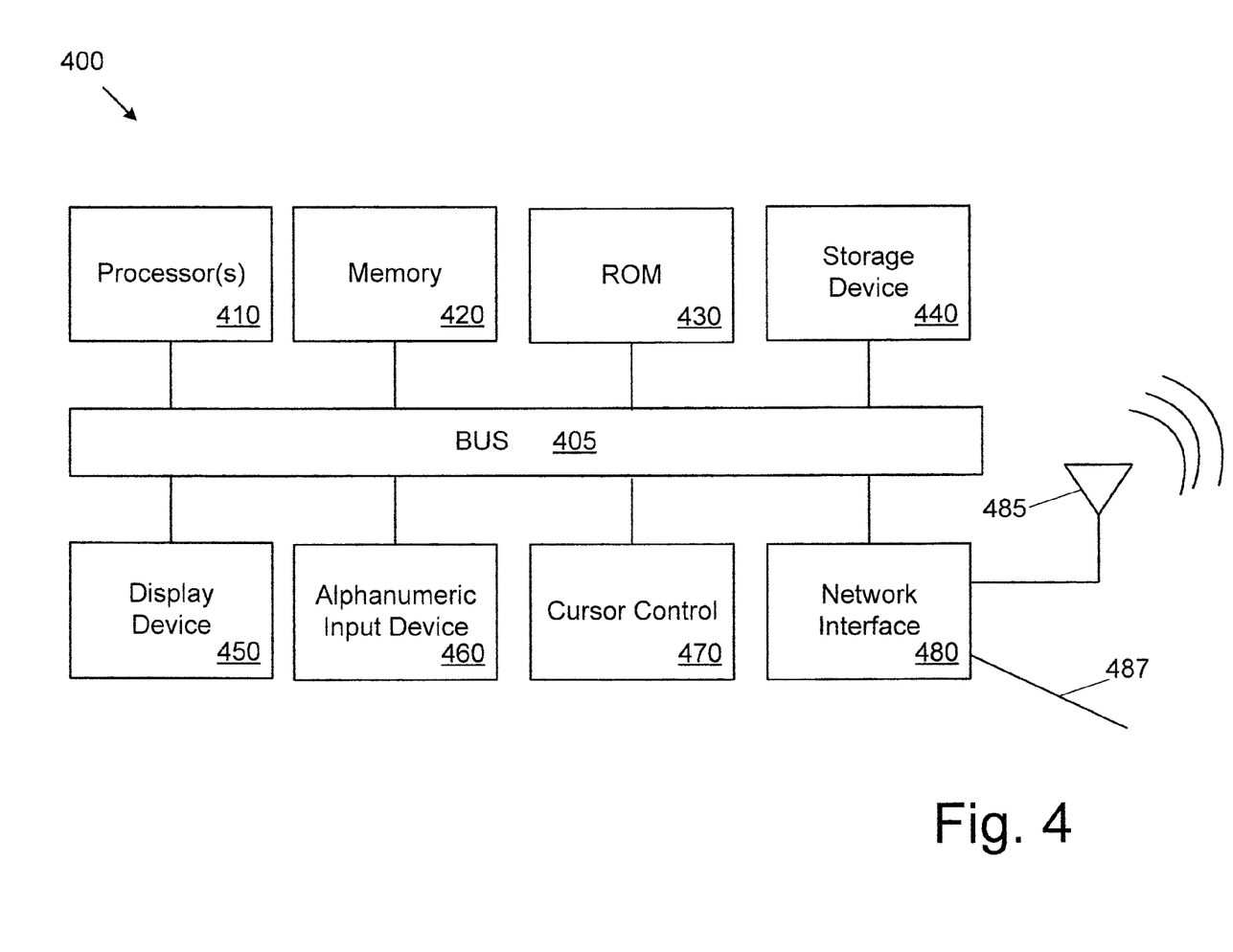
FIG. 4 is a block diagram of one embodiment of an electronic device that may function as an authentication server.

FIG. 4 is a block diagram of one embodiment of an electronic system that may function as an authentication server (e.g., local AAA server, home AAA server). Alternative electronic systems may include more, fewer and/or different components.

Electronic system 400 includes bus 405 or other communication device to communicate information, and processor 410 coupled to bus 405 that may process information. While electronic system 400 is illustrated with a single processor, electronic system 400 may include multiple processors and/or co-processors. Electronic system 400 further may include random access memory (RAM) or other dynamic storage device 420 (referred to as memory 420) coupled to bus 405 and may store information and instructions that may be executed by processor 410. Memory 420 may also be used to store temporary variables or other intermediate information during execution of instructions by processor 410.

Electronic system 400 may also include read only memory (ROM) and/or other static storage device 430 coupled to bus 405 that may store static information and instructions for processor 410. Data storage device 440 may be coupled to bus 405 to store information and instructions. Data storage device 440 such as a magnetic disk or optical disc and corresponding drive may be coupled to electronic system 400.

Instructions may be provided to memory 420 from a storage device, such as magnetic disk, a read-only memory (ROM) integrated circuit, CD-ROM, DVD, via a remote connection (e.g., over a network via network interface 430) that is either wired or wireless, etc. In alternative embodiments, hard-wired circuitry can be used in place of or in combination with software instructions. Thus, execution of sequences of instructions is not limited to any specific combination of hardware circuitry and software instructions.

A computer-readable medium includes any mechanism that provides content (e.g., computer executable instructions) in a form readable by an electronic device (e.g., a computer, a personal digital assistant, a cellular telephone). For example, a computer-readable medium may include read only memory (ROM); random access memory (RAM); magnetic disk storage media; optical storage media; flash memory devices; etc.

Electronic system 400 may also be coupled via bus 405 to display device 450, such as a cathode ray tube (CRT) or liquid crystal display (LCD), to display information to a user. Alphanumeric input device 460, including alphanumeric and other keys, may be coupled to bus 405 to communicate information and command selections to processor 410. Another type of user input device is cursor control 470, such as a mouse, a trackball, or cursor direction keys to communicate direction information and command selections to processor 410 and to control cursor movement on display 450.

Electronic system 400 further may include network interface(s) 480 to provide access to a network, such as a local area network. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

In one embodiment, network interface(s) 480 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported, for example, IEEE 802.16, discussed above.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

Figure 5:
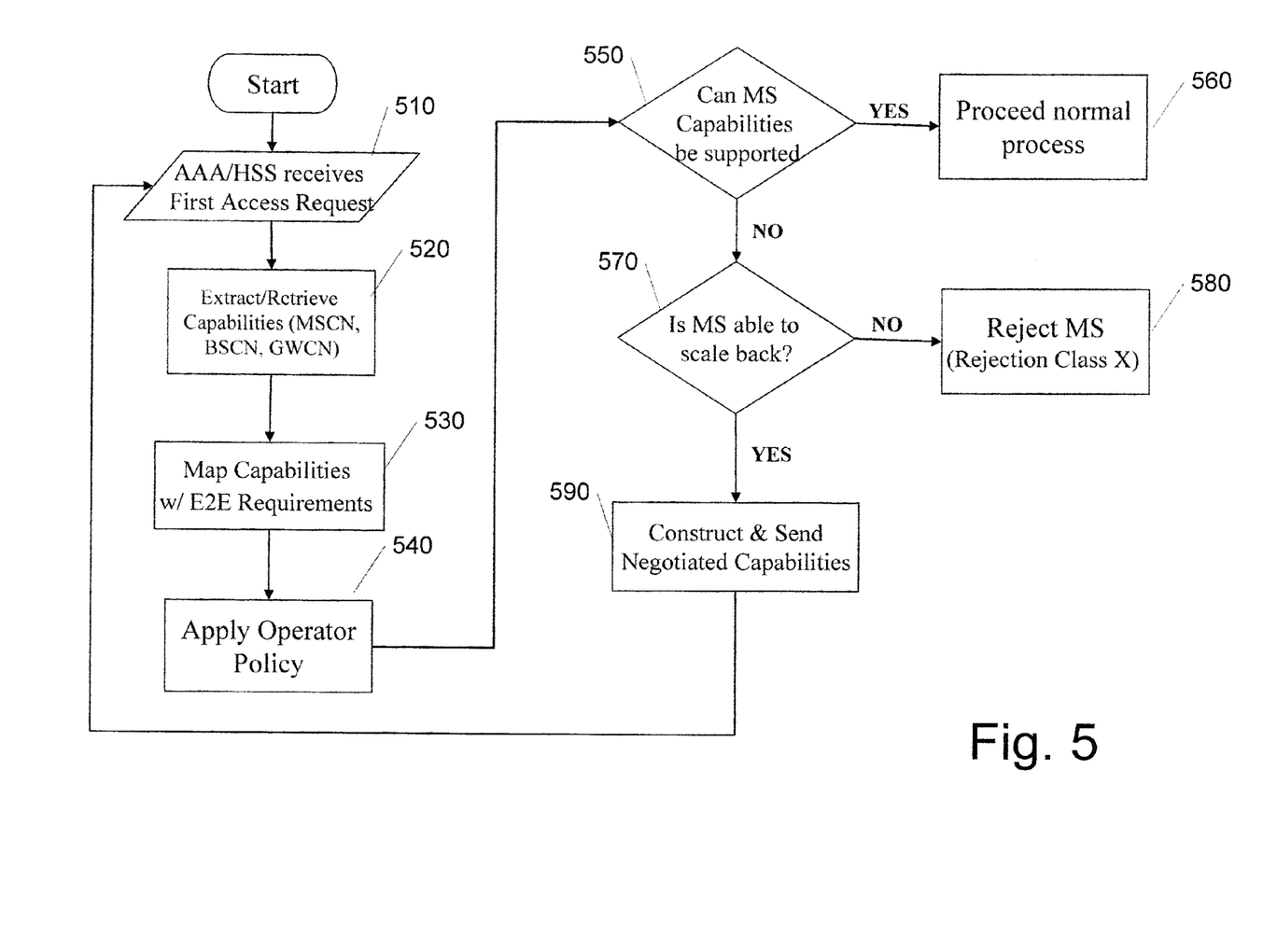
FIG. 5 is a flow diagram of one embodiment of a process for an authentication server to evaluate capabilities/compatibilities of a mobile device based on CNs.

FIG. 5 is a flow diagram of one embodiment of a process for an authentication server to evaluate capabilities/compatibilities of a mobile device based on CNs. The process of FIG. 5 may be performed by, for example, the electronic system of FIG. 4. The AAA (or HSS) may receive an access request from a mobile wireless device, 510. This access request includes the MSCN as well as CNs for the network elements through which the access request has traveled, as described above with respect to FIG. 3.

The AAA server (or HSS) extracts (for explicit formats) or retrieves (for implicit formats) capabilities based on the CNs included in the access request, 520. The AAA server (or HSS) maps the capabilities/compatibilities of the mobile wireless device with end-to-end requirements, 530. Based on the mapping, the AAA server (or HSS) applies the operator/network policy, 540. That is, the AAA server (or HSS) determines what resources, features and/or functionalities the mobile wireless device may utilize while connected to the network.

If the mobile wireless device capabilities can be supported, 550, the mobile wireless device is granted access to the network, 560, and is allowed to utilize those capabilities. If the mobile wireless device capabilities cannot be supported, 550, the AAA server (or HSS) determines whether the mobile wireless device capabilities can be scaled back, 570.

If the mobile wireless device capabilities cannot be scaled back, 570, the mobile wireless device may be rejected from the network, 580. If the mobile wireless device capabilities can be scaled back, 570, one or more messages may be sent to the mobile wireless device to negotiate scaled back access to the network 590. The mobile wireless device may be required to repeat the access request process with the scaled back capabilities enabled.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising: receiving, from an Authentication, Authorization and Accounting (AAA) server, feature compliance information received from a plurality of wireless network entities corresponding to multiple protocols and types of protocols as part of a network access request by a mobile wireless device, wherein receiving feature compliance information from the plurality of wireless network entities including at least a base station and a gateway as part of the network access request by the mobile wireless device comprises receiving mobile wireless device compliance information corresponding to the mobile wireless device, base station compliance information corresponding to the base station through which the mobile wireless device compliance information was received, and gateway compliance information corresponding to the gateway through which the mobile wireless device compliance information and the base station compliance information were received for end-to-end compliance signaling, wherein the compliance information comprises at least a compliance number (CN) in either an explicit format or an implicit format and fallback information to indicate whether the mobile station can fall back to previous releases/revisions/packages; selecting a set of features to be offered to the mobile wireless device based on the compliance information from the plurality of wireless network entities; and transmitting a response to the plurality of wireless network entities indicating the features to be offered to the mobile wireless device.

2. The method of claim 1 wherein the wireless network comprises an IEEE 802.16-compliant wireless network.

3. The method of claim 1 wherein the plurality of wireless network entities comprise at least the mobile wireless device, a base station, a gateway device and at least one authentication device.

4. The method of claim 1 wherein the mobile wireless device CN, the base station CN and the gateway CN are received by an authentication device of the wireless network and the authentication device selects one or more features to be provided to the mobile wireless device based, at least in part, on the mobile wireless device CN, the base station CN and the gateway CN.

5. The method of claim 4 wherein the authentication device sends a response indicating the selected one or more features to the gateway, the base station and the mobile wireless device.

6. The method of claim 1 wherein selecting the set of features to be offered to the mobile wireless device based on the compliance information from the plurality of wireless network entities comprises:

comparing the compliance information to requirements for a plurality of features offered by the wireless network; and selecting one or more features to be provided to the mobile wireless device based on the comparison.

7. An article comprising a non-transitory computer-readable medium having stored thereon instructions that, when executed, cause one or more processors to:

receive, from an Authentication, Authorization and Accounting (AAA) server, feature compliance information received from a plurality of wireless network entities corresponding to multiple protocols and types of protocols as part of a network access request by a mobile wireless device, wherein receiving feature compliance information from the plurality of wireless network entities including at least a base station and a gateway as part of the network access request by the mobile wireless device comprises receiving mobile wireless device compliance information corresponding to the mobile wireless device, base station compliance information corresponding to the base station through which the mobile wireless device compliance information was received, and gateway compliance information corresponding to the gateway through which the mobile wireless device compliance information and the base station compliance information were received for end-to-end compliance signaling, wherein the compliance information comprises at least a compliance number (CN) in either an explicit format or an implicit format and fallback information to indicate whether the mobile station can fall back to previous releases/revisions/packages; select a set of features to be offered to the mobile wireless device based on the compliance information from the plurality of wireless network entities; and transmit a response to the plurality of wireless network entities indicating the features to be offered to the mobile wireless device.

8. The article of claim 7 wherein the wireless network comprises an IEEE 802.16-compliant wireless network.

9. The article of claim 7 wherein the plurality of wireless network entities comprise at least the mobile wireless device, a base station, a gateway device and at least one authentication device.

10. The article of claim 7 wherein the mobile wireless device CN, the base station CN and the gateway CN are received by an authentication device of the wireless network and the authentication device selects one or more features to be provided to the mobile wireless device based, at least in part, on the mobile wireless device CN, the base station CN and the gateway CN.

11. The article of claim 10 wherein the authentication device sends a response indicating the selected one or more features to the gateway, the base station and the mobile wireless device.

12. The article of claim 7 wherein the instructions that cause the one or more processors to select the set of features to be offered to the mobile wireless device based on the compliance information from the plurality of wireless network entities comprise instructions that, when executed, cause the one or more processors to:

compare the compliance information to requirements for a plurality of features offered by the wireless network; and select one or more features to be provided to the mobile wireless device based on the comparison.

13. A wireless network authentication server comprising: a network interface to receive and transmit messages over a network, wherein at least a portion of the messages transmitted and received are related to authorization of a mobile wireless device to access at least a portion of a wireless network;

one or more processing elements coupled with the network interface, the one or more processing elements to receive, from an Authentication, Authorization and Accounting (AAA) server, feature compliance information corresponding to multiple protocols and types of protocols received from a plurality of wireless network entities as part of a network access request by a mobile wireless device, wherein receiving feature compliance information from the plurality of wireless network entities including at least a base station and a gateway as part of the network access request by the mobile wireless device comprises receiving mobile wireless device compliance information corresponding to the mobile wireless device, base station compliance information corresponding to the base station through which the mobile wireless device compliance information was received, and gateway compliance information corresponding to the gateway through which the mobile wireless device compliance information and the base station compliance information were received for end-to-end compliance signaling, wherein the compliance information comprises at least a compliance number (CN) in either an explicit format or an implicit format and fallback information to indicate whether the mobile station can fall back to previous releases/revisions/packages, and the network access request to select a set of features to be offered to the mobile wireless device, and to transmit a response to the plurality of wireless network entities indicating the features to be offered to the mobile wireless device.

14. The wireless network authentication server of claim 13 wherein the wireless network comprises an IEEE 802.16-compliant wireless network.

15. The wireless network authentication server of claim 13 wherein the plurality of wireless network entities comprise at least the mobile wireless device, a base station, a gateway device and at least one authentication device.

16. The wireless network authentication server of claim 13 wherein the one or more processing elements select the set of features to be offered to the mobile wireless device based on the compliance information from the plurality of wireless network entities, the one or more processing elements further to compare the compliance information to requirements for a plurality of features offered by the wireless network, and to select one or more features to be provided to the mobile wireless device based on the comparison.

* * * * *